United States Patent
Kish et al.

(10) Patent No.: US 9,979,626 B2
(45) Date of Patent: May 22, 2018

(54) ESTABLISHING A MESH NETWORK WITH WIRED AND WIRELESS LINKS

(75) Inventors: William S. Kish, Saratoga, CA (US); Allen Miu, Fremont, CA (US); Ron Mok, Sunnyvale, CA (US)

(73) Assignee: RUCKUS WIRELESS, INC., Sunnyvale, CA (US)

( * ) Notice: Subject to any disclaimer, the term of this patent is extended or adjusted under 35 U.S.C. 154(b) by 143 days.

(21) Appl. No.: 12/947,800

(22) Filed: Nov. 16, 2010

(65) Prior Publication Data

US 2011/0119360 A1    May 19, 2011

Related U.S. Application Data

(60) Provisional application No. 61/261,612, filed on Nov. 16, 2009.

(51) Int. Cl.
| | | |
|---|---|---|
| *H04L 12/701* | (2013.01) | |
| *H04L 12/705* | (2013.01) | |
| *H04W 40/02* | (2009.01) | |

(52) U.S. Cl.
CPC ............ *H04L 45/00* (2013.01); *H04L 45/18* (2013.01); *H04W 40/02* (2013.01)

(58) Field of Classification Search
CPC ........ H04L 45/18; H04L 45/00; H04W 40/02; H04W 76/04; H04W 84/18
USPC .......................................................... 709/221
See application file for complete search history.

(56) References Cited

U.S. PATENT DOCUMENTS

| | | |
|---|---|---|
| 1,653,664 A | 12/1927 | Kirkup |
| 4,176,356 A | 11/1979 | Foster et al. |
| 4,193,077 A | 3/1980 | Greenburg |
| 4,253,193 A | 2/1981 | Kennard |
| 4,305,052 A | 12/1981 | Baril et al. |
| 4,513,412 A | 4/1985 | Cox |
| 4,814,777 A | 3/1989 | Monser |
| 5,097,484 A | 3/1992 | Akaiwa |
| 5,117,430 A | 5/1992 | Berglund |
| 5,173,711 A | 12/1992 | Takeuchi et al. |
| 5,203,010 A | 4/1993 | Felix |
| 5,220,340 A | 6/1993 | Shafai |
| 5,220,678 A | 6/1993 | Feei |
| 5,361,256 A | 11/1994 | Doeringer |
| 5,373,548 A | 12/1994 | McCarthy |

(Continued)

FOREIGN PATENT DOCUMENTS

| | | |
|---|---|---|
| CN | 1 965 598 | 5/2007 |
| CN | 102763378 | 10/2012 |

(Continued)

OTHER PUBLICATIONS

Hirayama et al., Next-Generation Mobil-Access IP Network, Hitachi Review, vol. 49 (2000), No. 4, pp. 176-179.

(Continued)

*Primary Examiner* — Khaled Kassim
(74) *Attorney, Agent, or Firm* — Lewis Roca Rothgerber Christie LLP

(57) ABSTRACT

Embodiments of the present invention solve problems experienced by mesh networks concerning loop formation where two nodes are connected by both a wired and wireless link. The present invention prevents or 'breaks' a loop that that would otherwise result in continually repeating and delayed network data transmission.

15 Claims, 5 Drawing Sheets

(56) References Cited

U.S. PATENT DOCUMENTS

| | | |
|---|---|---|
| 5,408,465 A | 4/1995 | Gusella et al. |
| 5,507,035 A | 4/1996 | Bantz |
| 5,559,800 A | 9/1996 | Mousseau et al. |
| 5,570,366 A | 10/1996 | Baker |
| 5,608,726 A | 3/1997 | Virgile |
| 5,636,213 A | 6/1997 | Eastmond et al. |
| 5,754,145 A | 5/1998 | Evans |
| 5,767,809 A | 6/1998 | Chuang et al. |
| 5,802,312 A | 9/1998 | Lazaridis et al. |
| 5,867,109 A | 2/1999 | Wiedeman |
| 5,930,259 A | 7/1999 | Katsube |
| 5,940,771 A | 8/1999 | Gollnick et al. |
| 5,960,344 A | 9/1999 | Mahany |
| 5,964,830 A | 10/1999 | Durett |
| 5,970,410 A | 10/1999 | Carney et al. |
| 5,974,034 A | 10/1999 | Chin et al. |
| 6,018,659 A | 1/2000 | Ayyagari et al. |
| 6,034,638 A | 3/2000 | Thiel et al. |
| 6,044,062 A | 3/2000 | Brownrigg et al. |
| 6,088,570 A | 7/2000 | Komara et al. |
| 6,094,177 A | 7/2000 | Yamamoto |
| 6,132,306 A | 10/2000 | Trompower |
| 6,181,697 B1 | 1/2001 | Nurenberg |
| 6,249,516 B1 | 6/2001 | Brownrigg et al. |
| 6,266,528 B1 | 7/2001 | Farzaneh |
| 6,266,537 B1 | 7/2001 | Kashitani et al. |
| 6,292,153 B1 | 9/2001 | Aiello et al. |
| 6,307,524 B1 | 10/2001 | Britain |
| 6,317,599 B1 | 11/2001 | Rappaport et al. |
| 6,326,922 B1 | 12/2001 | Hegendoerfer |
| 6,337,628 B2 | 1/2002 | Campana, Jr. |
| 6,337,668 B1 | 1/2002 | Ito et al. |
| 6,339,404 B1 | 1/2002 | Johnson et al. |
| 6,345,043 B1 | 2/2002 | Hsu |
| 6,356,242 B1 | 3/2002 | Ploussios |
| 6,356,243 B1 | 3/2002 | Schneider et al. |
| 6,356,553 B1 | 3/2002 | Nagami et al. |
| 6,356,905 B1 | 3/2002 | Gershman et al. |
| 6,377,227 B1 | 4/2002 | Zhu et al. |
| 6,392,610 B1 | 5/2002 | Braun et al. |
| 6,393,261 B1 | 5/2002 | Lewis |
| 6,404,386 B1 | 6/2002 | Proctor, Jr. et al. |
| 6,404,775 B1 | 6/2002 | Leslie et al. |
| 6,407,719 B1 | 6/2002 | Ohira et al. |
| 6,414,955 B1 | 7/2002 | Clare et al. |
| 6,418,138 B1 | 7/2002 | Cerf et al. |
| 6,442,507 B1 | 8/2002 | Skidmore et al. |
| 6,445,688 B1 | 9/2002 | Garces et al. |
| 6,493,679 B1 | 12/2002 | Rappaport et al. |
| 6,498,589 B1 | 12/2002 | Horii |
| 6,499,006 B1 | 12/2002 | Rappaport et al. |
| 6,505,253 B1 | 1/2003 | Chiu |
| 6,507,321 B2 | 1/2003 | Oberschmidt et al. |
| 6,570,883 B1 | 5/2003 | Wong |
| 6,584,080 B1 | 6/2003 | Ganz et al. |
| 6,625,454 B1 | 9/2003 | Rappaport et al. |
| 6,674,459 B2 | 1/2004 | Ben-Shachar et al. |
| 6,701,522 B1 | 3/2004 | Rubin et al. |
| 6,704,301 B2 | 3/2004 | Chari et al. |
| 6,714,551 B1 | 3/2004 | Le-Ngoc |
| 6,725,281 B1 | 4/2004 | Zintel et al. |
| 6,728,514 B2 | 4/2004 | Bandeira et al. |
| 6,753,814 B2 | 6/2004 | Killen et al. |
| 6,762,723 B2 | 7/2004 | Nallo et al. |
| 6,778,517 B1 | 8/2004 | Lou et al. |
| 6,779,004 B1 | 8/2004 | Zintel |
| 6,819,287 B2 | 11/2004 | Sullivan et al. |
| 6,836,481 B1 | 12/2004 | Hotta |
| 6,873,627 B1 | 3/2005 | Miller |
| 6,876,280 B2 | 4/2005 | Nakano |
| 6,888,504 B2 | 5/2005 | Chiang et al. |
| 6,888,893 B2 | 5/2005 | Li et al. |
| 6,892,230 B1 | 5/2005 | Gu et al. |
| 6,906,678 B2 | 6/2005 | Chen |
| 6,910,068 B2 | 6/2005 | Zintel et al. |
| 6,924,768 B2 | 8/2005 | Wu et al. |
| 6,931,429 B2 | 8/2005 | Gouge et al. |
| 6,941,143 B2 | 9/2005 | Mathur |
| 6,950,019 B2 | 9/2005 | Bellone et al. |
| 6,957,042 B2 | 10/2005 | Williams |
| 6,957,277 B2 | 10/2005 | Yagyu et al. |
| 6,961,028 B2 | 11/2005 | Joy et al. |
| 6,973,622 B1 | 12/2005 | Rappaport et al. |
| 6,975,834 B1 | 12/2005 | Forster |
| 6,996,086 B2 | 2/2006 | Wolfe et al. |
| 7,034,770 B2 | 4/2006 | Yang et al. |
| 7,043,277 B1 | 5/2006 | Pfister |
| 7,050,809 B2 | 5/2006 | Lim |
| 7,053,853 B2 | 5/2006 | Merenda et al. |
| 7,064,717 B2 | 6/2006 | Kaluzni et al. |
| 7,076,274 B2 | 7/2006 | Jollota et al. |
| 7,085,814 B1 | 8/2006 | Gandhi et al. |
| 7,089,307 B2 | 8/2006 | Zintel et al. |
| 7,113,519 B2 | 9/2006 | Hammel et al. |
| 7,130,895 B2 | 10/2006 | Zintel et al. |
| 7,136,655 B2 | 11/2006 | Skafidas et al. |
| 7,149,197 B2 | 12/2006 | Garahi et al. |
| 7,157,757 B2 | 1/2007 | Parekh et al. |
| 7,161,934 B2 | 1/2007 | Buchsbaum |
| 7,164,667 B2 | 1/2007 | Rayment et al. |
| 7,171,223 B2 | 1/2007 | Herscovich et al. |
| 7,171,475 B2 | 1/2007 | Weisman et al. |
| 7,187,925 B2 | 3/2007 | Abhishek |
| 7,203,508 B2 | 4/2007 | Ohkubo et al. |
| 7,269,174 B2 | 9/2007 | Olson et al. |
| 7,283,494 B2 | 10/2007 | Hammel et al. |
| 7,289,505 B2 | 10/2007 | Sanchez |
| 7,292,617 B2 | 11/2007 | Beasley et al. |
| 7,321,571 B2 | 1/2008 | Schnack et al. |
| 7,336,642 B2 | 2/2008 | Rich et al. |
| 7,355,997 B2 | 4/2008 | Quian |
| 7,362,737 B2 | 4/2008 | Behroozi |
| 7,369,510 B1 | 5/2008 | Wong |
| 7,489,932 B2 | 2/2009 | Chari et al. |
| 7,496,680 B2 | 2/2009 | Canright |
| 7,505,426 B2 | 3/2009 | Srikrishna et al. |
| 7,505,447 B2 | 3/2009 | Kish et al. |
| 7,515,589 B2 | 4/2009 | Bacher et al. |
| 7,522,731 B2 | 4/2009 | Klemba et al. |
| 7,546,126 B2 | 6/2009 | Beasley et al. |
| 7,551,562 B2 | 6/2009 | Srikrishna et al. |
| 7,586,879 B2 * | 9/2009 | Chari et al. .................. 370/331 |
| 7,672,274 B2 | 3/2010 | Bims |
| 7,697,504 B2 | 4/2010 | Chari et al. |
| 7,715,395 B2 * | 5/2010 | Ginchereau et al. ......... 370/392 |
| 7,733,833 B2 | 6/2010 | Kalika et al. |
| 7,787,436 B2 | 8/2010 | Kish et al. |
| 7,852,837 B1 * | 12/2010 | Au ........................... H04B 1/74 |
| | | 370/389 |
| 7,853,829 B2 * | 12/2010 | Younger et al. ............... 714/37 |
| 7,916,684 B2 | 3/2011 | Henderson et al. |
| 7,974,223 B2 | 7/2011 | Zellig et al. |
| 8,089,869 B2 * | 1/2012 | Kisela et al. ................. 370/229 |
| 8,089,949 B2 | 1/2012 | Kish et al. |
| 8,125,975 B2 | 2/2012 | Kish et al. |
| 8,355,343 B2 | 1/2013 | Kish et al. |
| 8,547,899 B2 | 10/2013 | Kish |
| 8,619,662 B2 | 12/2013 | Kish |
| 8,634,402 B2 | 1/2014 | Kish |
| 8,638,708 B2 | 1/2014 | Kish |
| 8,688,834 B2 | 4/2014 | Fujimoto et al. |
| 8,780,760 B2 | 7/2014 | Kish |
| 8,824,357 B2 | 9/2014 | Kish et al. |
| 9,019,886 B2 | 4/2015 | Kish |
| 9,066,152 B2 | 6/2015 | Kish |
| 9,071,942 B2 | 6/2015 | Kish |
| 9,240,868 B2 | 1/2016 | Kish |
| 2001/0047474 A1 | 11/2001 | Takagi et al. |
| 2001/0055312 A1 | 12/2001 | Negus |
| 2002/0001310 A1 | 1/2002 | Mai |
| 2002/0031130 A1 | 3/2002 | Tsuchiya et al. |
| 2002/0036996 A1 | 3/2002 | Ozluturk et al. |
| 2002/0045435 A1 | 4/2002 | Fantaske |
| 2002/0047800 A1 | 4/2002 | Proctor, Jr. et al. |

(56) References Cited

U.S. PATENT DOCUMENTS

| | | |
|---|---|---|
| 2002/0080767 A1 | 6/2002 | Lee |
| 2002/0084942 A1 | 7/2002 | Tsai et al. |
| 2002/0105471 A1 | 8/2002 | Kojima et al. |
| 2002/0112058 A1 | 8/2002 | Weisman et al. |
| 2002/0114317 A1* | 8/2002 | Dorenbosch ........ H04L 12/6418 370/352 |
| 2002/0114330 A1 | 8/2002 | Cheung et al. |
| 2002/0143951 A1 | 10/2002 | Khan |
| 2002/0158798 A1 | 10/2002 | Chiang et al. |
| 2002/0158801 A1 | 10/2002 | Crilly, Jr. et al. |
| 2002/0164963 A1 | 11/2002 | Tehrani et al. |
| 2002/0170064 A1 | 11/2002 | Monroe et al. |
| 2002/0194367 A1 | 12/2002 | Nakamura et al. |
| 2003/0003917 A1 | 1/2003 | Copley et al. |
| 2003/0026240 A1 | 2/2003 | Eyuboglu et al. |
| 2003/0026268 A1 | 2/2003 | Nava |
| 2003/0030588 A1 | 2/2003 | Kalis et al. |
| 2003/0043786 A1 | 3/2003 | Kall |
| 2003/0063591 A1 | 4/2003 | Leung et al. |
| 2003/0122714 A1 | 7/2003 | Wannagot et al. |
| 2003/0129978 A1* | 7/2003 | Akiyama ................ H04B 3/54 455/426.1 |
| 2003/0133458 A1 | 7/2003 | Sato et al. |
| 2003/0169330 A1 | 9/2003 | Ben-Schachar et al. |
| 2003/0184490 A1 | 10/2003 | Raiman et al. |
| 2003/0189514 A1 | 10/2003 | Miyano et al. |
| 2003/0189521 A1 | 10/2003 | Yamamoto et al. |
| 2003/0189523 A1 | 10/2003 | Ojantakanen et al. |
| 2003/0210207 A1 | 11/2003 | Suh et al. |
| 2003/0227414 A1 | 12/2003 | Saliga et al. |
| 2003/0228857 A1 | 12/2003 | Maeki |
| 2003/0231593 A1 | 12/2003 | Bauman et al. |
| 2004/0008663 A1 | 1/2004 | Srikrishna |
| 2004/0014432 A1 | 1/2004 | Boyle |
| 2004/0017310 A1 | 1/2004 | Runkle et al. |
| 2004/0017860 A1 | 1/2004 | Liu |
| 2004/0027291 A1 | 2/2004 | Zhang et al. |
| 2004/0027304 A1 | 2/2004 | Chiang et al. |
| 2004/0028006 A1 | 2/2004 | Kayama |
| 2004/0032378 A1 | 2/2004 | Volman et al. |
| 2004/0036651 A1 | 2/2004 | Toda |
| 2004/0036654 A1 | 2/2004 | Hsieh |
| 2004/0041732 A1 | 3/2004 | Aikawa et al. |
| 2004/0048593 A1 | 3/2004 | Sano |
| 2004/0058690 A1 | 3/2004 | Ratzel et al. |
| 2004/0061653 A1 | 4/2004 | Webb et al. |
| 2004/0070543 A1 | 4/2004 | Masaki |
| 2004/0080455 A1 | 4/2004 | Lee |
| 2004/0085993 A1 | 5/2004 | Wentink |
| 2004/0095278 A1 | 5/2004 | Kanemoto et al. |
| 2004/0114535 A1 | 6/2004 | Hoffman et al. |
| 2004/0125777 A1 | 7/2004 | Doyle et al. |
| 2004/0190477 A1 | 9/2004 | Olson et al. |
| 2004/0260800 A1 | 12/2004 | Gu et al. |
| 2004/0264463 A1 | 12/2004 | Fukushima |
| 2005/0002395 A1 | 1/2005 | Kondo |
| 2005/0009523 A1 | 1/2005 | Pekonen |
| 2005/0022210 A1 | 1/2005 | Zintel et al. |
| 2005/0032531 A1 | 2/2005 | Gong et al. |
| 2005/0041739 A1 | 2/2005 | Li et al. |
| 2005/0042988 A1 | 2/2005 | Hoek et al. |
| 2005/0074018 A1 | 4/2005 | Zintel et al. |
| 2005/0074019 A1 | 4/2005 | Handforth et al. |
| 2005/0074108 A1 | 4/2005 | Zintel et al. |
| 2005/0097503 A1 | 5/2005 | Zintel et al. |
| 2005/0135480 A1 | 6/2005 | Li et al. |
| 2005/0138137 A1 | 6/2005 | Encarnacion et al. |
| 2005/0138193 A1 | 6/2005 | Encarnacion et al. |
| 2005/0153720 A1 | 7/2005 | White et al. |
| 2005/0180381 A1 | 8/2005 | Retzer et al. |
| 2005/0185666 A1 | 8/2005 | Raya et al. |
| 2005/0188193 A1 | 8/2005 | Kuehnel et al. |
| 2005/0226239 A1 | 10/2005 | Nishida et al. |
| 2005/0232179 A1* | 10/2005 | daCosta et al. .............. 370/315 |
| 2005/0240665 A1 | 10/2005 | Gu et al. |
| 2005/0250544 A1 | 11/2005 | Grant et al. |
| 2005/0267935 A1 | 12/2005 | Ghandi et al. |
| 2005/0271070 A1 | 12/2005 | Mikami et al. |
| 2006/0018335 A1 | 1/2006 | Koch |
| 2006/0045089 A1 | 3/2006 | Bacher et al. |
| 2006/0092864 A1* | 5/2006 | Gupta ..................... H04L 67/00 370/278 |
| 2006/0094371 A1 | 5/2006 | Nguyen |
| 2006/0098605 A1 | 5/2006 | Li |
| 2006/0098607 A1 | 5/2006 | Zeng et al. |
| 2006/0098613 A1 | 5/2006 | Kish et al. |
| 2006/0098616 A1 | 5/2006 | Kish et al. |
| 2006/0114881 A1 | 6/2006 | Chari et al. |
| 2006/0123124 A1 | 6/2006 | Weisman et al. |
| 2006/0123125 A1 | 6/2006 | Weisman et al. |
| 2006/0123455 A1 | 6/2006 | Pai et al. |
| 2006/0133341 A1 | 6/2006 | Chari et al. |
| 2006/0165029 A1 | 7/2006 | Melpignano et al. |
| 2006/0168159 A1 | 7/2006 | Weisman et al. |
| 2006/0184660 A1 | 8/2006 | Rao et al. |
| 2006/0184661 A1 | 8/2006 | Weisman et al. |
| 2006/0184693 A1 | 8/2006 | Rao et al. |
| 2006/0187660 A1 | 8/2006 | Rao et al. |
| 2006/0224690 A1 | 10/2006 | Falkenburg et al. |
| 2006/0225107 A1 | 10/2006 | Seetharaman et al. |
| 2006/0227761 A1 | 10/2006 | Scott, III et al. |
| 2006/0239369 A1 | 10/2006 | Lee |
| 2006/0268881 A1 | 11/2006 | Moreton |
| 2006/0280131 A1 | 12/2006 | Rahman et al. |
| 2006/0291434 A1 | 12/2006 | Gu et al. |
| 2007/0002750 A1 | 1/2007 | Sang et al. |
| 2007/0010271 A1* | 1/2007 | Roy ..................... H04W 24/00 455/517 |
| 2007/0027622 A1 | 2/2007 | Cleron et al. |
| 2007/0030811 A1 | 2/2007 | Frei et al. |
| 2007/0072612 A1 | 3/2007 | Haraguchi et al. |
| 2007/0101020 A1 | 5/2007 | Lin et al. |
| 2007/0109961 A1 | 5/2007 | Liang |
| 2007/0135167 A1 | 6/2007 | Liu |
| 2007/0189283 A1 | 8/2007 | Agarwal et al. |
| 2007/0223451 A1 | 9/2007 | Ren et al. |
| 2007/0242602 A1 | 10/2007 | Pang et al. |
| 2007/0280168 A1 | 12/2007 | Shibata |
| 2008/0043638 A1 | 2/2008 | Ribiere |
| 2008/0069068 A1 | 3/2008 | Dean et al. |
| 2008/0137681 A1 | 6/2008 | Kish et al. |
| 2008/0137682 A1 | 6/2008 | Kish et al. |
| 2008/0159207 A1* | 7/2008 | Levine et al. ................. 370/329 |
| 2008/0225804 A1 | 9/2008 | Thubert |
| 2008/0247317 A1 | 10/2008 | Weil et al. |
| 2008/0247327 A1 | 10/2008 | Weil et al. |
| 2008/0267116 A1 | 10/2008 | Kang et al. |
| 2009/0019314 A1 | 1/2009 | Younger et al. |
| 2009/0028095 A1 | 1/2009 | Kish et al. |
| 2009/0040989 A1 | 2/2009 | Da Costa et al. |
| 2009/0067369 A1 | 3/2009 | Stamoulis |
| 2009/0073921 A1* | 3/2009 | Ji et al. ......... 370/328 |
| 2009/0080333 A1 | 3/2009 | Ozer et al. |
| 2009/0154359 A1 | 6/2009 | Strutt et al. |
| 2009/0180396 A1 | 7/2009 | Kish et al. |
| 2009/0207730 A1* | 8/2009 | Stamoulis et al. .......... 370/230.1 |
| 2009/0213730 A1 | 8/2009 | Zeng et al. |
| 2009/0225676 A1* | 9/2009 | Kisela et al. ................. 370/252 |
| 2009/0262677 A1 | 10/2009 | Banerjea et al. |
| 2010/0040056 A1 | 2/2010 | Kobayashi |
| 2010/0085916 A1* | 4/2010 | Yu et al. ....................... 370/328 |
| 2010/0182944 A1 | 7/2010 | Kish et al. |
| 2011/0019653 A1* | 1/2011 | Seok ..................... H04W 48/16 370/338 |
| 2011/0096712 A1 | 4/2011 | Kish et al. |
| 2011/0119401 A1 | 5/2011 | Miu et al. |
| 2011/0130197 A1* | 6/2011 | Bytnar ..................... G07F 17/32 463/25 |
| 2011/0158233 A1 | 6/2011 | Namgung |
| 2011/0216685 A1 | 9/2011 | Kish et al. |
| 2012/0063379 A1 | 3/2012 | Kish et al. |
| 2013/0010775 A1 | 1/2013 | Kish et al. |
| 2013/0194969 A1 | 8/2013 | Kish et al. |
| 2014/0016563 A1 | 1/2014 | Kish |

(56) References Cited

U.S. PATENT DOCUMENTS

| | | | |
|---|---|---|---|
| 2014/0071879 | A1 | 3/2014 | Kish |
| 2014/0133385 | A1 | 5/2014 | Kish |
| 2014/0175117 | A1 | 6/2014 | Kish |
| 2015/0312727 | A1 | 10/2015 | Kish |

FOREIGN PATENT DOCUMENTS

| | | |
|---|---|---|
| EP | 0352787 | 7/1989 |
| EP | 0534612 | 3/1993 |
| EP | 1315311 | 5/2003 |
| EP | 11450521 | 8/2004 |
| EP | 1608108 | 12/2005 |
| EP | 1 653 664 | 5/2006 |
| EP | 2 350 863 | 8/2015 |
| GB | 2306278 | 4/1997 |
| JP | 3038933 | 7/1989 |
| JP | 2008088633 | 2/1996 |
| JP | 2001057560 | 2/2002 |
| JP | 2005354249 | 12/2005 |
| JP | 2006060408 | 3/2006 |
| VN | 31159 | 10/2012 |
| WO | WO2002025967 | 3/2002 |
| WO | WO200249360 | 6/2002 |
| WO | WO2003079484 | 9/2003 |
| WO | WO 2004/057817 | 7/2004 |
| WO | 2005/008938 | 1/2005 |
| WO | WO 2006/052639 | 5/2006 |
| WO | WO 2007/016326 | 2/2007 |
| WO | WO 2009/088488 | 7/2009 |
| WO | WO 2011/060454 | 5/2011 |
| WO | WO 2012/061531 | 5/2012 |

OTHER PUBLICATIONS

Hjalmtysson et al., Overcoming Last-Hop/First-Hop Problems in IP Multicast, Reykjavik University, Dept. of Computer Science, Ofanleiti 2, 103 Reykjavik, Iceland, (The Icelandic Centre for Research under grant No. 020500002.).
Visoottiviseth et al., Sender-Initiated Multicast Forwarding Scheme, Telecommunications, 2003, ICT 2003 10th International Conference, pp. 334-339, downloaded on Mar. 26, 2009 from IEEE Xplore, 0-7803-7661 (c) 2003 IEEE.
Tang et al., Mac Reliable Broadcast in Ad Hoc Networks, Computer Science Dept., University of California, Los Angeles, pp. 1008-1013, 0-7803-7225 (c) 2001 IEEE.
Tsunekawa, Kouichi, "Diversity Antennas for Portable Telephones", 39th IEEE Vehicular Technology Conference, pp. 50-56, vol. 1, Gateway to New Concepts in Vehicular Technology, May 1-3, 1989, San Francisco, CA.
Dell Inc., "How Much Broadcast and Multicast Traffic Should I Allow in My Network," PowerConnect Application Note #5, Nov. 2003.
Toskala, Antti, "Enhancement of Broadcast and Introduction of Multicast Capabilities in RAN," Nokia Networks, Palm Springs, California, Mar. 13-16, 2001.
Microsoft Corporation, "IEEE 802.11 Networks and Windows XP," Windows Hardware Developer Central, Dec. 4, 2001.
Festag, Andreas, "What is MOMBASA?" Telecommunication Networks Group (TKN), Technical University of Berlin, Mar. 7, 2002.
Hewlett Packard, "HP ProCurve Networking: Enterprise Wireless LAN Networking and Mobility Solutions," 2003.
Dutta, Ashutosh et al., "MarconiNet Supporting Streaming Media Over Localized Wireless Multicast," Proc. of the 2d Int'l Workshop on Mobile Commerce, 2002.
Dunkels, Adam et al., "Making TCP/IP Viable for Wireless Sensor Networks," Proc. of the 1st Euro. Workshop on Wireless Sensor Networks, Berlin, Jan. 2004.
Dunkels, Adam et al., "Connecting Wireless Sensornets with TCP/IP Networks," Proc. of the 2d Int'l Conf. on Wired Networks, Frankfurt, Feb. 2004.
Cisco Systems, "Cisco Aironet Access Point Software Configuration Guide: Configuring Filters and Quality of Service," Aug. 2003.
Ken Tang, et al., "MAC Layer Broadcast Support in 802.11 Wireless Networks," Computer Science Department, University of California, Los Angeles, 2000 IEEE, pp. 544-548.
Vincent D. Park, et al., "A Performance Comparison of the Temporally-Ordered Routing Algorithm and Ideal Link-State Routing," IEEE, Jul. 1998, pp. 592-598.
Ian F. Akyildiz, et al., "A Virtual Topology Based Routing Protocol for Multihop Dynamic Wireless Networks," Broadband and Wireless Networking Lab, School of Electrical and Computer Engineering, Georgia Institute of Technology.
Pat Calhoun et al., "802.11r strengthens wireless voice," Technology Update, Network World, Aug. 22, 2005, http://www.networkworld.com/news/tech/2005/082208techupdate.html.
Areg Alimian et al., "Analysis of Roaming Techniques," doc.:IEEE 802.11-04/0377r1, Submission, Mar. 2004.
Information Society Technologies Ultrawaves, "System Concept / Architecture Design and Communication Stack Requirement Document," Feb. 23, 2004.
Golmie, Nada, "Coexistence in Wireless Networks: Challenges and System-Level Solutions in the Unlicensed Bands," Cambridge University Press, 2006.
Mawa, Rakesh, "Power Control in 3G Systems," Hughes Systique Corporation, Jun. 28, 2006.
Wennstrom, Mattias et al., "Transmit Antenna Diversity in Ricean Fading MIMO Channels with Co-Channel Interference," 2001.
Steger, Christopher et al., "Performance of IEEE 802.11b Wireless LAN in an Emulated Mobile Channel," 2003.
Chang, Nicholas B. et al., "Optimal Channel Probing and Transmission Scheduling for Opportunistics Spectrum Access," Sep. 2007.
Gillham, Bruce et al. JUNOSe Internet Software for E-series Routing Platforms Policy and QoS Configuration Guide, Release 7.0x.
Fair queuing, http://en.wikipedia.org/wiki/Fair_queuing.
Weighted Fair Queuing, http://en.wikipedia.org/wiki/Weighted_fair_queuing.
Weighted Round Robin, http://en.wikipedia.org/wiki/Weighted_round_robin.
PCT Search Report and Written Opinion for PCT/US08/014148 dated Mar. 30, 2009.
PCT Search Report and Written Opinion for PCT/US11/059019 dated Feb. 21, 2012.
PCT Search Report and Written Opinion for PCT/US05/039760 dated Sep. 14, 2006.
PCT Search Report and Written Opinion for PCT/US05/039760 dated May 3, 2011.
U.S. Appl. No. 12/008,715, Office Action dated Sep. 2, 2011.
U.S. Appl. No. 12/181,274, Final Office Action dated Jan. 18, 2012.
U.S. Appl. No. 11/985,865, Office Action dated Dec. 20, 2010.
U.S. Appl. No. 12/947,803, Office Action dated Aug. 27, 2012.
CN Application No. 20058001629.7, Office Action dated Feb. 21, 2012.
U.S. Appl. No. 12/181,274, Office Action dated Nov. 15, 2012.
U.S. Appl. No. 12/938,316, Office Action dated Nov. 20, 2012.
U.S. Appl. No. 12/947,800, Office Action dated Sep. 26, 2012.
U.S. Appl. No. 14/160,402 Office Action dated Oct. 22, 2014.
U.S. Appl. No. 14/080,488, Office Action dated Oct. 21, 2014.
U.S. Appl. No. 11/267,477, Decision on Appeal mailed Nov. 11, 2014.
U.S. Appl. No. 14/028,323, Office Action dated Oct. 14, 2014.
U.S. Appl. No. 14/080,488, filed Nov. 14, 2013, William S.Kish, MAC Based Mapping in IP Based Communications.
U.S. Appl. No. 14/028,323, filed Sep. 16, 2013, William S.Kish, Wireless Network Throughput Enhancement Through Channel Aware Scheduling.
U.S. Appl. No. 14/106,514, filed Dec. 13, 2013, William S.Kish, Unicast to Multicast Conversion.
Chinese Application No. 201080002467.X, Office Action dated Jul. 3, 2014.
Chinese Application No. 20058001629.7, Office Action dated Aug. 6, 2014.

(56) References Cited

OTHER PUBLICATIONS

U.S. Appl. No. 14/106,514, Office Action dated Sep. 22, 2014.
Chinese Application No. 201080002467.X, Second Office Action dated Jan. 26, 2015.
EP Application No. 10813061.8. Supplementary European Search Report dated Jul. 23, 2012.
U.S. Appl. No. 13/736,017 Office Action dated Nov. 21, 2013.
Chinese Application No. 20058001629.7, Office Action dated Jan. 21, 2014.
EP Application No. 10813061.8. Supplementary European Search Report dated Oct. 13, 2011.
TW Application No. 094138837, Office Action dated Apr. 25, 2013.
TW Application No. 094138837, Office Action dated Nov. 28, 2011.
U.S. Appl. No. 12/181,274, Final Office Action dated Jun. 19, 2013.
U.S. Appl. No. 12/947,803, Final Office Action dated Jul. 17, 2013.
U.S. Appl. No. 11/267,477, Office Action dated Apr. 8, 2015.
U.S. Appl. No. 12/947,803, Office Action dated Mar. 12, 2015.
U.S. Appl. No. 14/028,323, Final Office Action dated Jun. 12, 2015.
U.S. Appl. No. 14/748,141, filed Jun. 23, 2015, William S. Kish, Distributed Access Point for IP Based Communications.
Taiwan Application No. 103106913, Office Action dated May 28, 2015.
Chinese Application No. 201080002467.X, Notice of Grant dated Jul. 30, 2015.
European Application No. 10813061.8 Communication to Grant dated Mar. 10, 2015.
U.S. Appl. No. 14/979,018, filed Dec. 22, 2015, William S. Kish, Increasing Reliable Data Throughput in a Wireless Network.
Akyildiz et al., "Wireless mesh networks: a survey," Computer Networks, 2005.
Cato et al., "Method for Easier, Better, and Faster Site Surveys for Wireless Networks," IBM Technical Disclosure Bulletin, vol. 40, No. 1, 1997.
Chawla, "Design of a Wireless Backhaul Network for Microcells," 1999.
Johansson et al., "Relaying Access Points and Related Business Models for Low Cost Mobile Systems," 2004.
Yanikomeroglu, "Cellular Multihop Communications: Infrastructure—Based Relay Network Architecture for 4G Wireless Systems," 2004.

* cited by examiner

ESTABLISHING A MESH NETWORK WITH WIRED AND WIRELESS LINKS

CROSS-REFERENCE TO RELATED APPLICATIONS

The present application claims the priority benefit of U.S. provisional application No. 61/261,612 filed Nov. 16, 2009, the disclosure of which incorporate herein by reference.

The present application is related to U.S. patent application Ser. No. 12/008,715 filed Jan. 11, 2008 and entitled "Determining Associations in a Mesh Network." The disclosure of the aforementioned applications is incorporated by reference.

BACKGROUND OF THE INVENTION

Field of the Invention

The present invention generally relates to wired and wireless communication networks and more particularly to establishing a mesh network with wired and wireless links.

Description of Related Art

A mesh network allows for communication of information through multiple nodes, which may be distributed over a wide area. The multiple nodes allow for an information packet to travel through multiple routes to a given receiving node or device. The nodes in a mesh network may communicate through wired (e.g. Ethernet) or wireless connections (e.g., IEEE 802.x).

In a lightweight mesh network, a single wired node may serve as an access point (e.g., a base station). The base station may be in communication with multiple wireless receiving nodes. Each node may have an internal mesh basic service set (MBSS). Each MBSS in the mesh network may have a unique basic service set identifier (BSSID) but share an identical service set identifier (SSID) and/or pre-shared key (PSK). A node may identify another node in the network by reference to that node's BSSID. The transmission of an information packet from one node to another may be referred to as a hop. Each of the nodes in a mesh network may connect with one another through one or more hops. For example, a first receiving node, or child node, receives information from a parent node via one hop.

A mesh network where all nodes are directly connected to one other may be referred to as a fully connected network. A mesh network where only some nodes are connected to all other or a subset of nodes may be referred to as a partially connected network. Information transmission in a fully connected network may take only one hop (e.g., from a originating node to a destination child node). In a partially connected mesh network, however, information transmission may require multiple hops through multiple nodes. If there is one node is not directly connected to a particular destination node, transmission of information from the origin to the destination may require passage through an intermediate node (or nodes) thereby invoking at least a two hop transmission.

In a network composed of wireless and wired links, an information packet may be transmitted to a receiving node or device through multiple nodes over wireless and/or wired connections. Where two nodes are connected by a wireless and a wired link (e.g., an 802.x and an Ethernet connection), the wired link may serve as an alternate route by which the information packet may travel; the wireless connection may be the primary means of packet delivery. The particular route taken by an information packet may be determined by various available routing algorithms at the originating and/or intermediate nodes. Routing algorithms generally seek to transmit and allow for the delivery of information packets to a destination node as quickly and efficiently as possible.

Determining a route in a partially connected network or wired and wireless connections presents a difficult optimization problem. Routing algorithms may have to determine how a node learns what other nodes are available, with which of the other node(s) to associate, which associations allow for the quickest and most efficient information transfer, and the reliability of those connections. Some routing algorithms may determine or require that a receiving node be associated with particular route(s) and/or particular parent node(s).

Various circumstances may nevertheless require that a route be changed for a given receiving node. For example, an intermediate transmission node may fail whereby the receiving node and/or parent node has to associate with a different intermediate node. Other circumstances requiring a change in routing may include changes in network traffic volume, changes in data rates, security requirements, and even changes in environmental conditions that might affect the network (e.g., the weather).

Another problem experienced by a mesh network is loop formation. A loop can form where two nodes are connected by both a wired and wireless link. Since an information packet can travel through any of the two links between the two nodes, it is possible that once a packet is transmitted to a receiving node via the wired link, the packet can be transmitted back to the sending node via the wireless link or vice versa. A loop may be formed resulting in data transmission that continually repeats between two nodes. The result is delays in data transmission and decreased network capacity.

SUMMARY OF THE INVENTION

In one exemplary embodiment, a system for hybrid mesh networking is described. The system includes a root node and a first node connected via a wired connection (i.e., Ethernet) to a second node. The root node acts as a wired backhaul gateway and provides nodes and devices in the hybrid mesh network with wireless access to another network such as the Internet. Upon the determination that the first node and the second node are connected via the Ethernet connection, wireless communication between the first node and the second node is suspended, and the second node commences communication with the root node by way of the Ethernet connection.

In another exemplary embodiment, a method for hybrid mesh networking is described. A first node detects the presence of a second node in the hybrid mesh network and then determines whether the first node and the second node are connected via an Ethernet connection. Upon the determination that the two nodes are connected via the Ethernet connection, wireless communication between the first node and second node is suspended. Further communication between the first node and the second node then commences by way of the wired connection.

DETAILED DESCRIPTION

Figure 1:
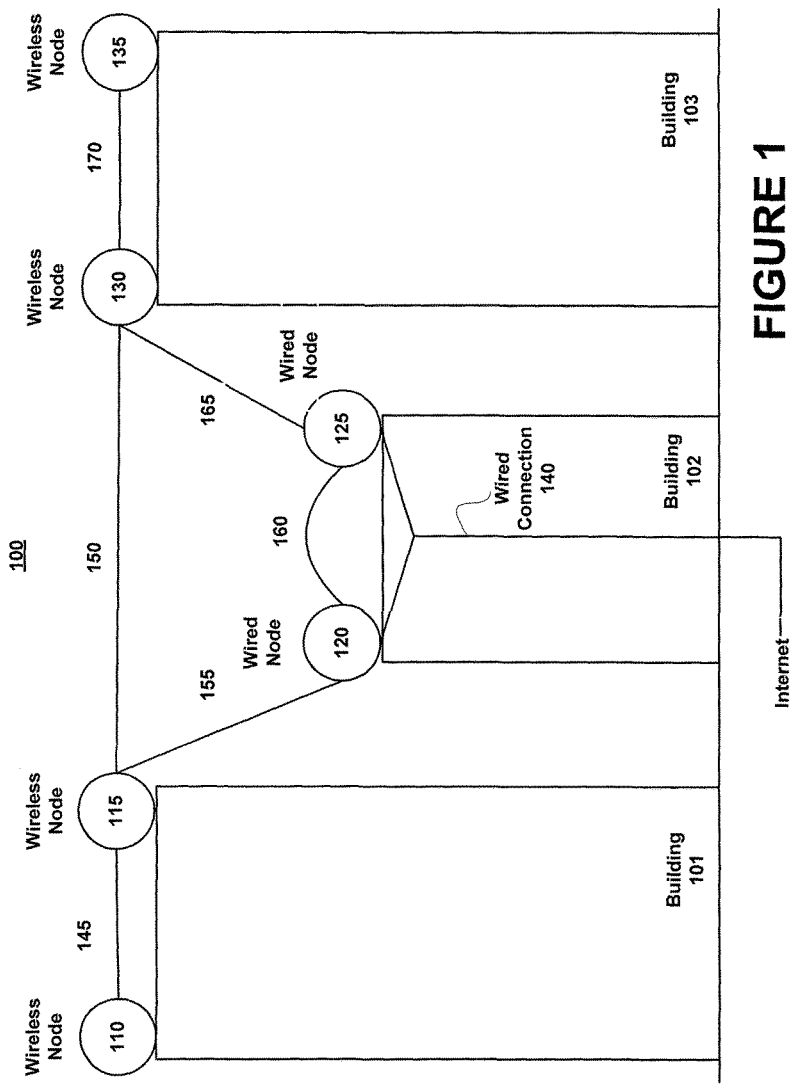
FIG. 1 illustrates a hybrid mesh network implemented in an urban setting.

FIG. 1 illustrates a hybrid mesh network 100 implemented in an urban setting. Hybrid mesh network 100 can operate in an urban setting in various structures including commercial or residential buildings 101-103. Hybrid mesh network 100 may be a mesh network that includes both wired nodes 120 and 125 and wireless nodes 110, 115, 130, and 135. Route 140 may be a wired route (e.g. Ethernet) between nodes 120 and 125. Alternatively, the wired route can be a dedicated point-to-point microwave link that provides an Ethernet abstraction. A route may also be wireless as is the case with routes 145, 150, 155, 160, 165, and 170. The illustrated routes (140-170) demonstrate the variety of possible routes and associations between the nodes.

Hybrid mesh network 100 may allow for the transmission of various electromagnetic waves, including wireless radio signals. Hybrid mesh network 100 may be an IEEE 802.11 (Wireless LAN), IEEE 802.16 (WiMax), or other IEEE standards based network. Hybrid mesh network 100 may be local, proprietary, or part of a larger wide-area or metropolitan area network (WAN or MAN). Certain security protocols or encryption methodologies may be used to ensure the security of data exchanges over network 100.

Figure 2:
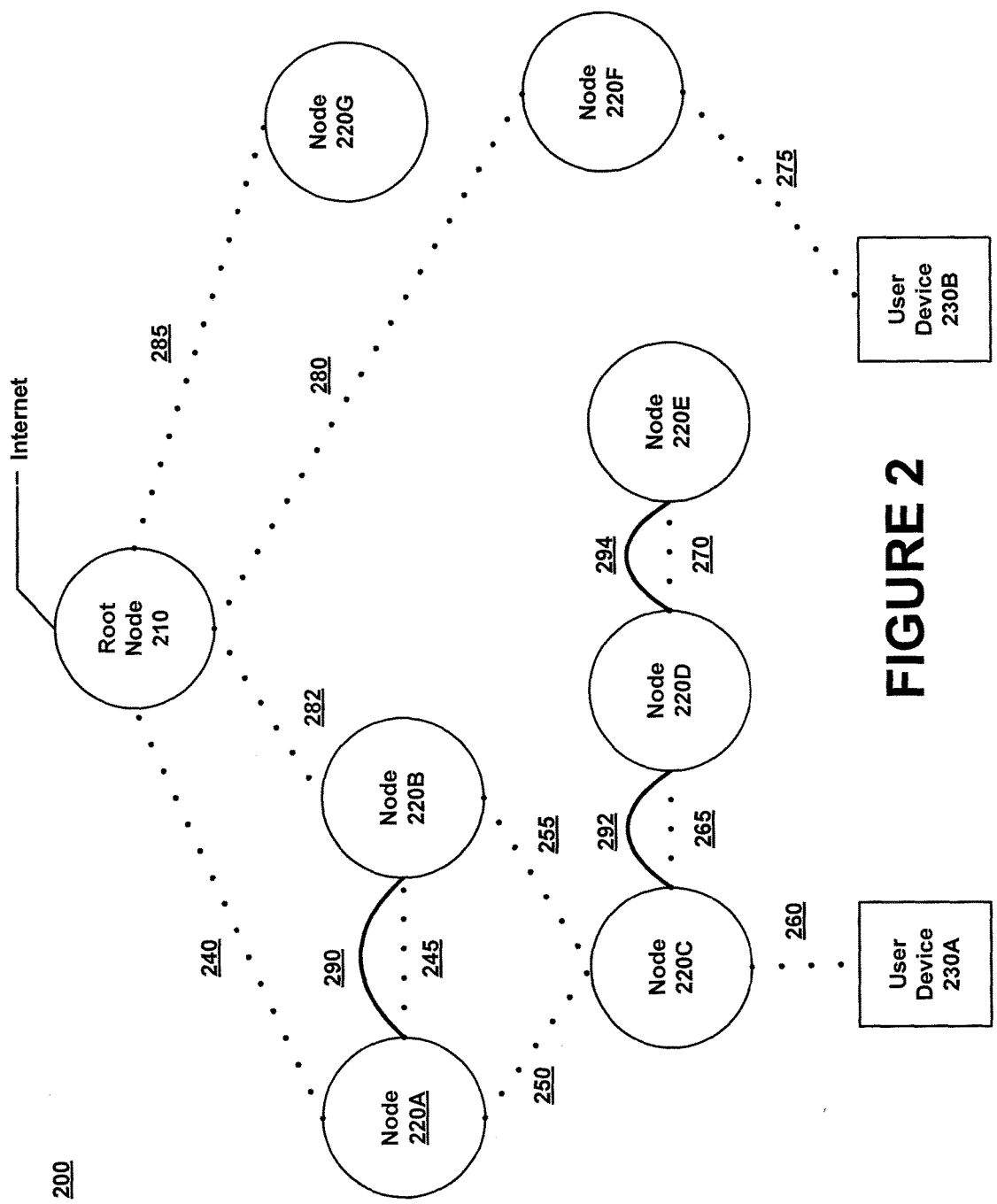
FIG. 2 illustrates a hybrid mesh network including a root node, intermediate nodes, and end user devices.

FIG. 2 illustrates a hybrid mesh network 200 including a root node 210, intermediate nodes 220A-220G, and end user devices 230A-230B. A hybrid network 200 like that of FIG. 2 may be established in an urban setting like that illustrated in FIG. 1. Routes 290, 292, and 294 are wired routes between nodes 220A-220B, 220C-220D, and 220 D-220E, respectively. Where two nodes are connected by wired and wireless routes, the wired route may serve as another uplink option for the nodes in the network 200. Hybrid mesh network 200 can support more than one wired network segment at different levels in the topology. FIG. 2 illustrates various possibilities for node associations and routing. For example, information may be transmitted between root 210 and user device 230A by way of wireless route 282 to node 220B, then node 220A by way of wired route 290, followed by a hop to node 220C by way of wireless route 250 and on to user device 230A by way of wireless route 260. The same origin to destination may be achieved by way of node 220B and node 220C using only wireless routes 282, 255, and 260 (i.e., omitted the wired transmission to node 220A by way of route 290). Network 200 may have certain redundancies in order to maintain optimal network connectivity. For example, each node may be connected to at least two nodes in order to maintain connection during a failure in a transmission path.

Root node 210 of FIG. 2 may be a wired backhaul gateway that provides other nodes and devices in the network 200 with access to another network such as the Internet. Backhaul throughput is the throughput between a node and the root node 210. Root node 210 may advertise an infinite backhaul throughput to other nodes and devices in the network 200.

Root node 210 may be an access point, a proxy server, and/or a firewall server. Root node 210 may be implemented such that it can withstand a failure in its transmission path. For example, if the backhaul throughput of root node 210 fails, root node 210 may establish a wireless upstream connection with another root node (not shown) in the network 200 to maintain network connectivity for all downstream nodes and devices. If backhaul throughput is restored, root node 210 can then revert back to being a root node for optimal performance instead of wirelessly communicating with said other root node. Nodes 220A-220G may include a variety of wired and/or wireless transceiver devices distributed over a particular geographic area, which may be as local as the interior of a building or expansive as a metropolitan area and surrounding environs (e.g., the urban environment of FIG. 1).

Each of nodes 220A-220G may receive information transmitted over a route including root node 210. For example, nodes 220A, 220B, 220F and 220G may receive information directly from root node 210 whereas information sent to node 220C may have to pass through node 220A or 220B. Wireless link 240 illustrates a wireless connection between node 220A and root node 210. Node 220A is, in turn, a parent node to node 220C through wireless link 250 as is node 220B by way of wireless link 255. Nodes 220A and 220B are connected via wired link 290 in addition to wireless link 245. Nodes 220A and 220B can receive and/or transmit information through either link.

Some nodes in network 200 may automatically associate with root node 210. Alternatively, nodes may associate with a parent node based on, for example, uplink throughput. For example, node 220C may consider associating with various candidate nodes in an effort to communicate with root node 210. The candidate nodes for such a communications link include nodes 220A and 220B. Using information concerning both backhaul and local throughput for each of the candidate nodes, node 220C may calculate an uplink throughput for each candidate node. An uplink throughput of a candidate node is an approximate throughput from the root node 210 to the calculating node (e.g., node 220C) if that node were to associate with a particular candidate node. Based on the uplink throughput calculated for each candidate node, the calculating node seeking an uplink association (e.g., node 220C) may determine which of the candidate nodes offers optimal uplink throughput, which may be representative of the highest uplink throughput.

Network nodes 220A-220G may also be used to transmit information to a user device. User devices 230A-B may be used by end users to receive information transmitted through network 200. User devices 230A-B may include wireless enabled devices such as laptops and smart phones. Information from another network, such as the Internet, may be transmitted through mesh network 200 to a user device, such as user device 230A. For example, root node 210 can transmit information from the Internet to user device 230A through nodes 220A and 220C. To transmit information from root node 210 to user device 230A through the aforementioned hops would require using wireless link 240 to node 220A, then wireless link 250 to node 220C, and finally, wireless link 260 to user device 230A. Other user devices (e.g., user device 230B) may receive information through different routes. As illustrated in FIG. 2, user device 230B is connected to node 220F, which is connected to root node 210 over wireless link 280.

Figure 3:
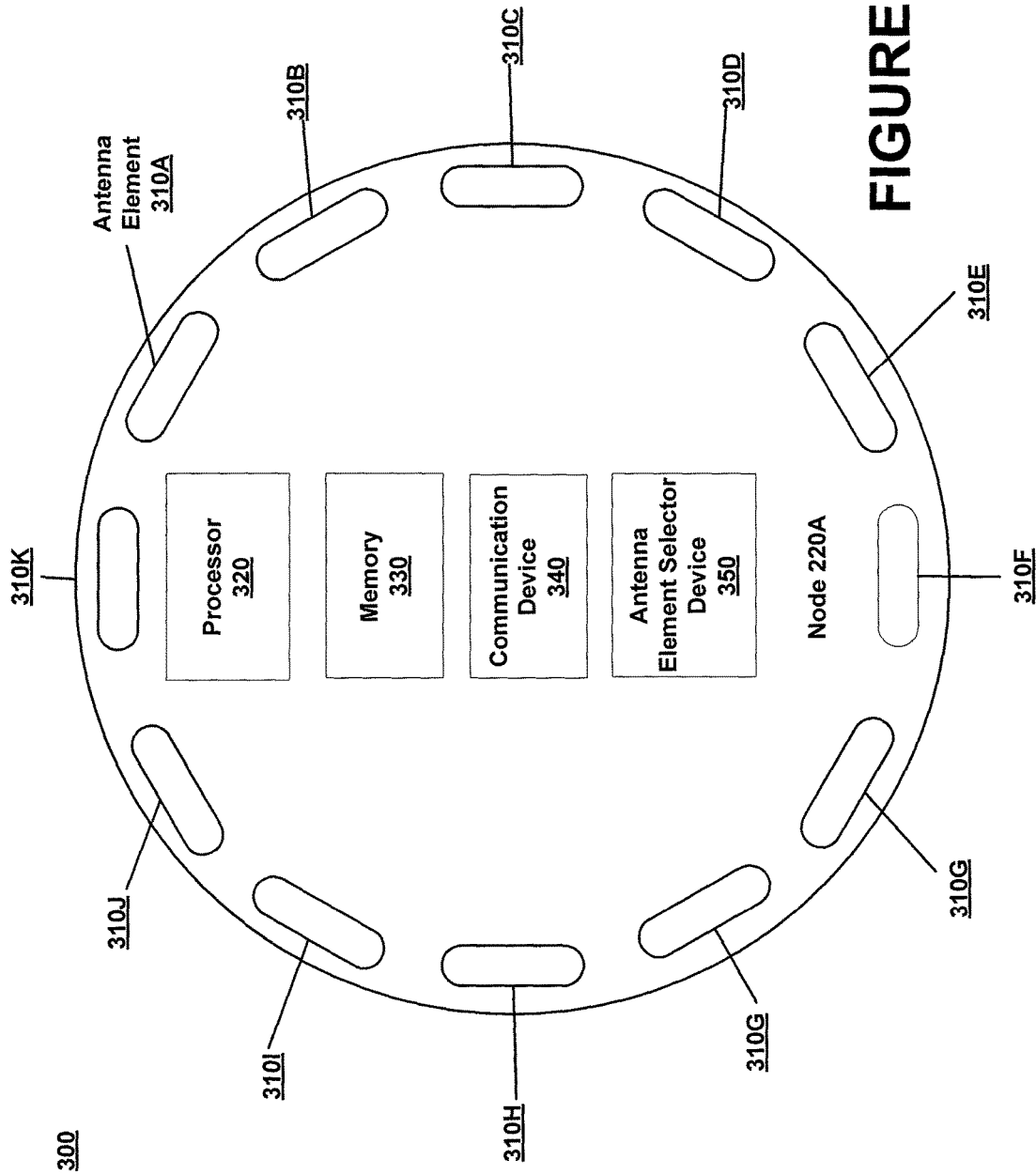
FIG. 3 illustrates a node that may be implemented in a hybrid mesh network.

FIG. 3 illustrates a node that may be implemented in a hybrid mesh network. Node 220A may be implemented in a wireless network like that discussed in the context of FIG. 2 and/or FIG. 1. Node 220A may include antenna elements 310A-K, a processor 320, memory 330, a communication device 340, and an antenna element selector device 350. Node 220A may learn about local throughput and backhaul throughput from other candidate nodes using information sent and received by way of antenna elements 310A-K. The throughput information may be stored in memory 330. Using the information stored in memory 330, processor 320 determines an uplink throughput for each candidate node. Antenna elements 310A-K may then create a wireless association with the candidate node based on the determined uplink throughput and the operation of the antenna element selector device 350.

Node 220A may include a plurality of individually selectable antenna elements 310A-K like those disclosed in U.S. Pat. No. 7,292,198 for a "System and Method for an Omnidirectional Planar Antenna Apparatus," the disclosure of which is incorporated herein by reference. When selected, each of the individual antenna elements produces a directional radiation pattern with gain (as compared to an omnidirectional antenna). Although antenna elements 310A-K are symmetrically positioned along the outer edges of node 220A in FIG. 3, the positioning of antenna elements 310A-K is not limited to a circular arrangement; the antenna elements 310A-K can be positioned or arranged in a variety of ways on node 220A.

Antenna elements 310A-K may include a variety of antenna systems used to receive and transmit data packets wirelessly. The antenna element 310A can receive packet data, Transmission Control Protocol (TCP) data, User Datagram Protocol (UDP) data, as well as feedback and other informational data from another node using an IEEE 802.xx wireless protocol. One or more wireless links may be created by antenna element 310A to allow for data transmission between node 220A and various other nodes in hybrid mesh network 100. For example, node 220A may be associated with one or more parent node(s); further, node 220A may act as a parent node with associated receiving nodes. In some embodiments, node 220A may be associated with only one parent node. Node 220A may operate similarly to those wireless devices disclosed in U.S. patent publication number 2006-0040707 for a "System and Method for Transmission Parameter Control for an Antenna Apparatus with Selectable Elements," the disclosure of which is incorporated by reference.

Node 220A learns about various candidate nodes in a network by using antenna elements 310A-K to periodically send out background traffic. For example, antenna element 310A may send out probe requests, which may be received by various candidate nodes. Where node 220A is already associated with a parent node, antenna element 310A may send out probe requests only to certain candidate nodes, such as candidate nodes highly ranked in memory 330 (described below). Antenna element 310A may also limit the probe requests to those candidate nodes whose backhaul throughput is the same or higher than the backhaul throughput of the parent node.

The candidate nodes may send probe responses, which may be received by antenna element 310A. A candidate node in a network may advertise backhaul throughput information concerning the throughput between the candidate node and the root node 210. Receiving the backhaul information in response to its probe request, antenna element 310A may then provide such information concerning the candidate node to memory 330 and/or processor 320. In addition, antenna element 310A may request and receive local throughput information. Local throughput is an approximate measure of the throughput between the candidate node and node 220A. Antenna element 310A may use a signal, such as TxCtrl, to provide local throughput information based on results of transmission attempts to a candidate node.

Antenna element 310A may further emit a beacon to advertise the backhaul throughput of node 220A to other nodes in hybrid mesh network 100. Other nodes in hybrid mesh network 100 attempting to learn about mesh traffic can send out their own probe requests which may be received by antenna element 310A. In some embodiments, antenna element 310A may be provided with an uplink throughput associated with the parent node of node 220A. Antenna element 310A may then advertise that uplink throughput as the backhaul throughput of node 220A. The other nodes may receive that backhaul information in response to their own probe requests and may use that backhaul information to determine whether to associate with node 220A.

Processor 320 may execute a routing algorithm to calculate the uplink throughput by using local and backhaul throughput information. The uplink throughput may be ranked in memory 330; memory 330 may also receive updated information concerning the other nodes. Updated information concerning local or backhaul throughput, for example, may result in updated uplink throughput.

Other information may be stored in memory 330 and subsequently used. For example, information concerning optimal or detrimental antenna configurations, attempted transmissions, successful transmissions, success ratio, received signal strength indicator (RSSI), and various associations between the same may be stored in memory 330 and used in conjunction with or instead of pure throughput calculations to determine an optimized mesh network connection. Information concerning noise floor, channel, transmission or round-trip delay, channel utilization, and interference levels may also be used.

Processor 320 executes a variety of operations. The processor 320 may comprise a microcontroller, a microprocessor, or an application-specific integrated circuit (ASIC). The processor 320 may execute programs stored in the memory 330. Using the information in memory 330, processor 320 executes the appropriate routing and/or other algorithms determines with which of the candidate nodes to associate with node 220A. The determination may be based on the uplink throughput of the candidate nodes. For example, processor 320 may determine uplink throughputs for each candidate node in hybrid mesh network 100. Uplink throughput may be closely approximated using backhaul and local throughput information. An approximation may be derived using the following formula: $1/(1/\text{local throughput} + 1/\text{backhaul throughput})$. The uplink throughput determined for each candidate node may also be stored in memory 330. By comparing the uplink throughput information, processor 320 determines which candidate node to associate with node 220A. For example, the candidate node with the highest uplink throughput may be chosen to be parent node to node 220A.

Processor 320 may also include a centralized management controller (not shown). The centralized management controller may be integrated or operate in conjunction with processor 320 albeit physically separate from the same. The controller may monitor a feature or aspect of the network or node including but not limited to how network topology changes over time, overall network performance, and node failure events. A node may report to the controller and the controller can in turn monitor radio channel assignment and various metrics including but not limited to the number of hops from a candidate node to a root node, route speed, route bandwidth, and load associated with the node. Information about a particular node or aspect of the network may be stored in memory 330 and processed by processor 320. The information stored in memory 330 may further include each node's BSSID, SNR, and local and backhaul throughput or may include load information, the number of hops from a candidate node to the root node, and radio channel information. The controller can also control network topology and form an arbitrary topology.

The centralized management controller may also monitor and control radio channel assignment. A first node in the network may be assigned to a radio channel that is different than a channel assigned to a second node. The option of assigning different radio channels to different nodes can improve network capacity by reducing co-channel interference.

A change in radio channel may be implemented on a root node and propagated down the topology in a matter of seconds according to standard protocols. The centralized management controller may also automatically scan and monitor different radio channels to determine an optimal radio channel. Once the controller finds an optimal radio channel, the change is implemented at the root node and propagated downwards. A user or client may also access the controller and manually select an optimal radio channel for a particular root node.

Memory 330 may store various executable instructions, algorithms, and programs. Memory 330 stores information concerning local throughput between wnode 220A and various candidate nodes in hybrid mesh network 100. The information stored in memory 330 may be used to determine an approximate uplink throughput from the root node 210 to node 220A. An exemplary memory 330 may detail information concerning a candidate node including BSSID, signal-to-noise ratio (SNR) of last probe response, local throughput, backhaul throughput, and determined uplink throughput. In some embodiments, the stored information may be ranked, for example, by uplink throughputs from highest to lowest. Memory 330 may be dynamic due to accumulation of information.

Information in memory 330 may be updated such that processor 320 may determine that another candidate node has a higher uplink throughput. As a result, processor 320 may direct antenna element 310A to disconnect from a current parent node and to connect instead to the other candidate node with the higher uplink throughput. In some embodiments, the uplink throughput of the other candidate node must exceed the uplink throughput of the current parent by a certain amount before processor 320 will instruct antenna element 310A to re-associate with the new candidate node. Heuristics may also be involved in determining whether disassociation/re-association occurs.

The memory 330 may also store transmission schedules, which may specify transmit instructions including physical layer transmission rates for a communication device 340 and antenna configurations for the antenna element 310A. The transmissions schedule may also include additional information such as transmit power. The transmission schedule may be embodied as a program for execution by low-level hardware or firmware. The transmission schedule may also be embodied as a set of transmission metrics that allow for 'tuning' of transmission and retransmission processes in a more efficient manner.

Node 220A may also include a communication device 340 for converting data at a physical data rate and for generating and/or receiving a corresponding RF signal. The communication device 340 may include, for example, one or more radio modulator/demodulators for converting data received by the node 220A (e.g., from a router) into the RF signal for transmission to one or more of the receiving user devices 230A-B. The communication device 340 may also comprise circuitry for receiving data packets of video from the router and circuitry for converting the data packets into 802.11 compliant RF signals. Various other hardware and/or software devices and/or elements may be integrated with communication device 340 (e.g., physical integration or a communicative coupling) as to allow for the processing and/or conversion of various other data formats into 802.xx compliant RF signals.

The processor 320 controls the communication device 340 to select a physical data rate (i.e., one of the multiple physical data rates). The processor 320 controls the physical data rate at which the communication device 340 converts data bits into RF signals for transmission via the antenna element 310A. The selection of a physical data rate may be associated with a particular antenna configuration, and/or other transmission parameters (e.g., transmit power) in the context of a transmission schedule.

Antenna element selector device 350 operates to selectively couple one or more of the antenna elements 310A-K to the communication device 340. Various embodiments of an antenna elements 310A-K and the antenna element selector device 350 are disclosed in U.S. patent application Ser. Nos. 11/010,076; 11/022,080; and 11/041,145, the disclosures of which are incorporated herein by reference.

The antenna element selector device 350 may be coupled to the processor 320 to allow, for example, selection from among multiple radiation patterns. The processor 320 controls the antenna element selector device 350 to select an antenna configuration (i.e., one of the multiple radiation patterns) of the antenna element 310A. The antenna selector device 350 may accept and respond to information (instructions) related to a transmission schedule with regard to the selection of a particular antenna configuration.

Figure 4:
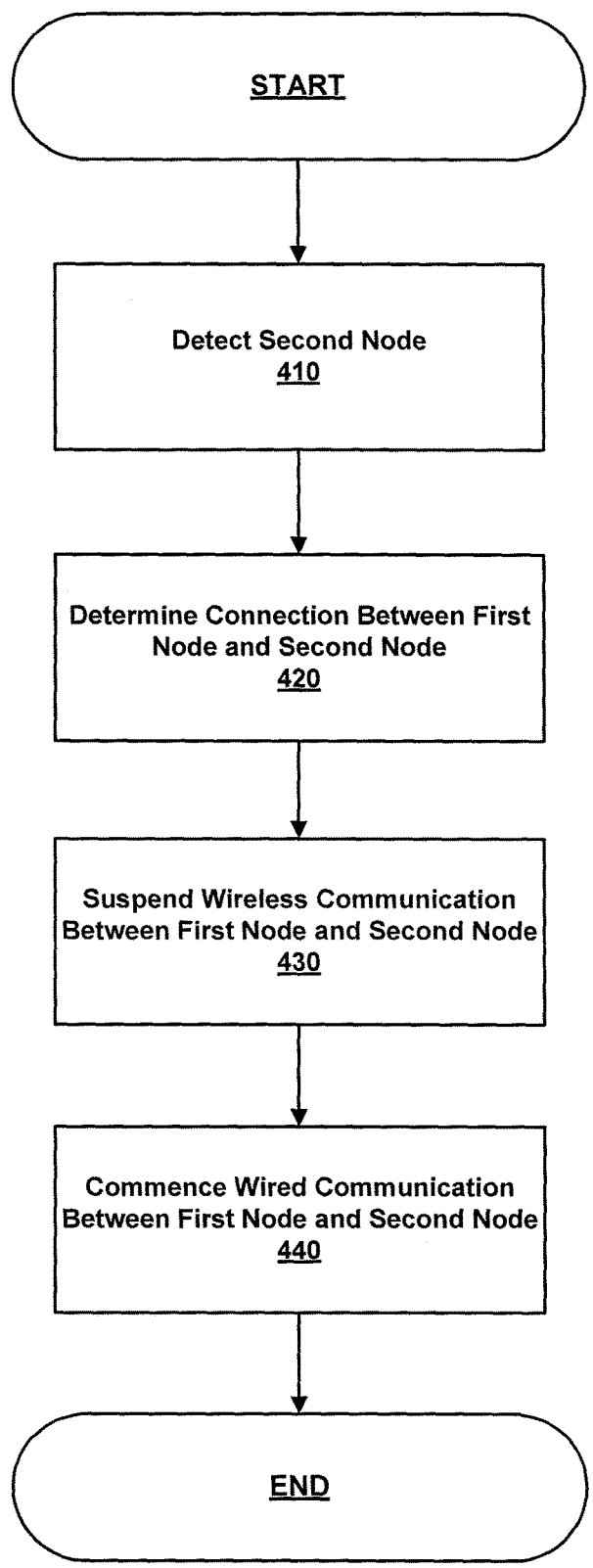
FIG. 4 illustrates a method for breaking a loop between two nodes in a hybrid mesh network.

FIG. 4 illustrates a method 400 for breaking a loop between two nodes in a hybrid mesh network. More specifically, the method 400 of FIG. 4 illustrates the breaking of a loop for a node connected via a wired link and wireless link in said network. The steps of the process of FIG. 4 may be embodied in hardware or software including a non-transitory computer-readable storage medium including instructions executable by a processor of a computing device. The steps identified in FIG. 4 (and the order thereof) are exemplary and may include various alternatives, equivalents, or derivations thereof including but not limited to the order of execution of the same.

At step 410, a first node detects the presence of a second node in the hybrid mesh network through the Ethernet connection. The second node may be a root node, upstream node, parent node or ancestor node. Wired nodes (or nodes with a wired connection) send periodic broadcasts (wired beacons) over their corresponding Ethernet connection. A first node detects a second node on the Ethernet if the first node receives wired beacons from the second node. An embodiment of the present invention may encapsulate wired beacons within a standard VLAN frame with a pre-configured VLAN_ID. Wired beacons could be encapsulated in other types of packets as long as they could be transported over the Ethernet and could be identified by the access point as wired beacons to be consumed by the access point and not be forwarded over the wireless link.

At step 420, the first node determines whether the first node and the second node are connected via an Ethernet connection. Once the second node is detected, it may be automatically assumed to be connected, and proceed to step 430 to suspend the wireless connection. Embodiments of the present invention may recognize that the Ethernet link may not be the best connection available for optimal performance. For example, an Ethernet connection may support 10 Mbps whereas a wireless 802.11n link can support up to 300

Mbps. In such an instance, the access points may suspend the Ethernet link in favor of the wireless link due to better throughput estimate.

Even if the Ethernet link is suspended, the first node may continue to receive wired beacons. The suspension could be achieved by suspending the necessary packet forwarding logic between the wired and wireless interfaces to break loops. Through such an implementation, an access point can keep listening to the Ethernet interface(s) and listen for wired beacons.

At step 430, wireless communication between the first node and the second node is suspended based on the determination that the first node and the second node are connected via the Ethernet connection. Communication between the first node and the second node then commences by way of the Ethernet connection. The suspension of wireless communication between the first node and second node prevents loop formation. Suspension of wireless communication may also occur upon the detection through the Ethernet of a gateway in the network, a root node, a parent or ancestor node, or the appearance of a source packet on multiple ports.

Wireless communication may also be suspended upon the determination that a particular node in the LAN or within a cluster of nodes has the highest approximation of uplink throughput to the root node. For example, a first node and second may be connected by a wired and wireless link. The approximation of uplink throughput information of the second node may be received by the first node as a result of a probe request. The first node may alternatively receive the approximation of uplink throughput of the second node via a broadcast, multicast or unicast addressing, or any other method of disseminating throughput information. Such message or broadcast could be sent on a periodic basis or according to a schedule. The first node may compare the received approximation of uplink throughput to local throughput and the node with the optimal (or highest) approximation of uplink throughput is determined.

The processor 320 may determine that the second node has a lesser approximation of uplink throughput to the root node than the approximation of uplink throughput of the first node to the root node. In such scenario, the first node has the highest approximation of uplink throughput between the two nodes and the first node suspends wireless communication with the second node. The first node may then send a message or broadcast to all other nodes in the LAN or within a cluster of nodes that it has the highest approximation of uplink throughput to the root node.

At step 440, wired communication between the first node and second node commences by way of the wired connection.

Figure 5:
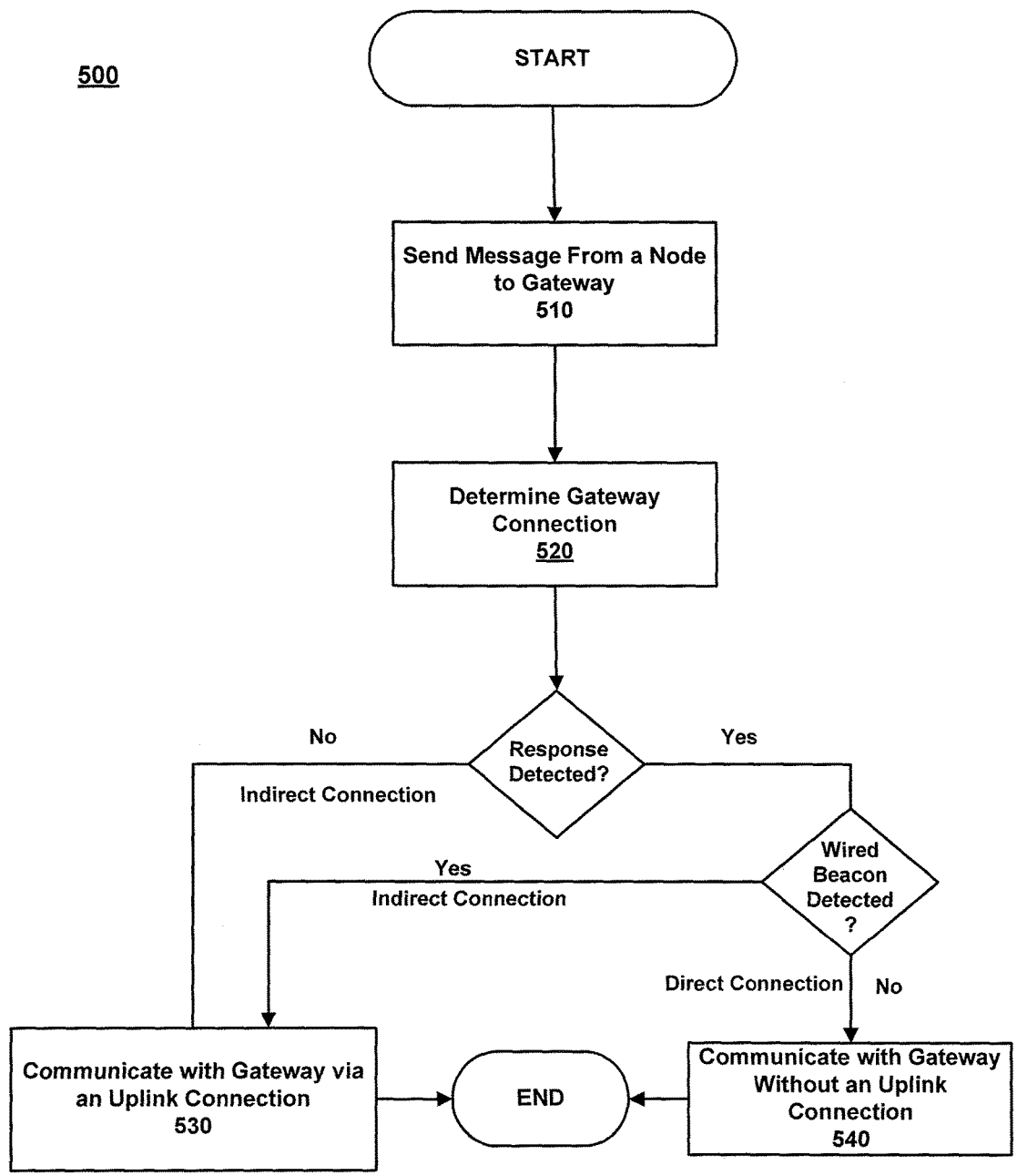
FIG. 5 illustrates a method for determining role assignment in a hybrid mesh network.

FIG. 5 illustrates a method 500 for determining role assignment in a hybrid mesh network. The steps of the process of FIG. 5 may be embodied in hardware or software including a non-transitory computer-readable storage medium including instructions executable by a processor of a computing device. The steps identified in FIG. 5 (and the order thereof) are exemplary and may include various alternatives, equivalents, or derivations thereof including but not limited to the order of execution of the same.

At step 510, a node may send out a message (e.g., using Address Resolution Protocol) to a gateway via a wired connection. For example, a first node may use a gateway detection mechanism to send out a message to the gateway to elicit a response from it. The message or broadcast could be sent on a periodic basis or according to any other schedule.

At step 520, the node determines whether the node has direct or indirect connection with the gateway based on the gateway response to the message and a detectable presence of a wired beacon on the Ethernet connection. The gateway may or may not send a response and the node may or may not receive a response from the gateway. In any instance where the node receives a response from the gateway or where the presence of a wire beacon is detected, such response or information may be stored in memory 330 and processed by processor 320. If the node does not receive a response from the gateway within a certain period of time, the node determines that there is an indirect connection between the node and the gateway (e.g. the transmission path to the gateway traverses at least one hop). The node may then communicate with the gateway via an uplink connection with another node at step 530.

If the node receives a response from the gateway and a wired beacon is detected, the node may determine that there is an indirect connection between the node and the gateway. The node may communicate with the gateway via an uplink connection with another node at step 530. If the node receives a response from the gateway and a wired beacon is not detected, the node may determine that there is a direct connection between the node and gateway (e.g. the transmission path to the gateway does not traverse a hop). The node may then communicate with the gateway without requiring an uplink connection to another node at step 540.

In step 540, wireless communication between the second node and an upstream node is suspended after the processor 320 determines that the second node has a lesser approximation of uplink throughput to the root node than the approximation of uplink throughput of the first node to the root node.

The present invention may be implemented in the context of core and access networks. A hybrid mesh may be an access network that provides wireless clients communication access to the core network, which then provides access to other networks such as the Internet. A root node in such a network provides wireless access to the core network. A gateway in the core network then provides access to another network such as the Internet. The core network may include backhaul links, which could be wired (Ethernet) or wireless (microwave or point to point), or even another independent hybrid mesh network. Chains of hybrid mesh networks can be created to establish more than two levels thereby extending core v. access heirarchys in the network.

Other network routes may be used besides wired and 802.x wireless networks. For example, in addition to multiple 802.x radios (e.g., a 5 GHz and a 2 GHz radio), other point-to-point links may used such as microwave, Bluetooth, and fiber. Such links could be used to improve capacity and/or serve as a redundant link for failovers.

While the present invention has been described in connection with a series of illustrative embodiments, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A system for networking in a hybrid mesh network, the system comprising:
   a first node configured to be deployable among a plurality of nodes in the hybrid mesh network, the first node being further configured to be communicatively connected to a second node of the plurality of nodes by a wireless connection, and to be communicatively connected to a root node, wherein the first node includes a wired communication interface, a wireless communication interface and a packet forwarding logic between said wired and wireless interfaces; and wherein the first node is configured to detect that the first node is communicatively connected to the second node by a wired connection in addition to the wireless connection by receiving a wired beacon, to determine, in response to receiving an approximation uplink throughput of the second node through the root node, that the first node has an uplink throughput to the root node that is greater than that of the second node, and, in response to the detection and the determination, to suspend said packet forwarding logic between said wired and wireless interfaces of the first node to break a loop between the wired connection and the wireless connection, and wherein the first node continues to receive wired beacons from a plurality of other nodes in the hybrid mesh network by way of the suspended wired connection with the second node;

wherein the first node is further configured to suspend the packet forwarding logic of the wireless connection based on detection of an appearance of a source packet on multiple ports.

2. The system in claim 1, wherein the first node is further configured to suspend the packet forwarding logic of the wireless connection based on detection of another gateway via the wired connection.

3. The system in claim 1, wherein the first node is further configured to suspend the packet forwarding logic of the wireless connection based on detection of the root node via the wired connection.

4. The system in claim 1, wherein the first node is further configured to suspend the packet forwarding logic of the wireless connection based on detection of an upstream node via the wired connection.

5. The system in claim 1, wherein the second node is configured to commence communication with the root node by way of the first node, in response to the determination.

6. The system of claim 1, wherein the wired connection is an Ethernet connection, and wherein the root node is configured to act as a gateway between a wired network and the plurality of nodes.

7. The system of claim 1, wherein the first node is configured to suspend the wireless connection by initiating a change changing of a radio channel of the first node or the second node.

8. The system of claim 7, further including a centralized management controller configured to monitor and assign radio channel selection of the first node and the second node.

9. The system of claim 8, wherein the centralized management controller is configured to direct the second node to suspend the wireless connection with the root node and wherein the second node commences communication with the root node by way of the first node and the wired connection based on a direction by the centralized management controller.

10. The system of claim 8, wherein the centralized management controller is configured to assign the first node and the second node to different radio channels.

11. A method for networking in a hybrid mesh network, the method comprising:

detecting, by a first node configured to be deployable among the hybrid mesh network, a presence of a second node in the hybrid mesh network, wherein the first node includes a wired communication interface, a wireless communication interface and a packet forwarding logic between said wired and wireless interfaces;

determining, by the first node, that, in addition to being communicatively connected by a wireless connection, the first node and a second node have become communicatively connected via an Ethernet connection; and in response to receiving an approximation uplink throughput of the second node through a root node, determining, by the first node, that the first node has an uplink throughput to the root node that is greater than that of the second node; and in response to the detection and the determination, suspending said packet forwarding logic between said wired and wireless interfaces of the first node to break a loop between the wired connection and the Ethernet connection, and wherein the first node continues to receive wired beacons from a plurality of other nodes in the hybrid mesh network by way of the suspended Ethernet connection;

wherein the determination that the first node and the second node have become communicatively connected via the Ethernet connection is based on detection of a source packet on multiple ports.

12. The method of claim 11, wherein the determination that the first node and the second node are connected via the Ethernet connection is based on detection of a gateway via the Ethernet connection.

13. The method of claim 11, wherein the determination that the first node and the second node have become communicatively connected via the Ethernet connection is based on detection of the root node via the Ethernet connection.

14. The method of claim 11, wherein the determination that the first node and the second node have become communicatively connected via the Ethernet connection is based on detection of an upstream node via the Ethernet connection.

15. The method of claim 11, wherein suspending the wireless connection between the first node and the second node includes initiating a change of a radio channel of the first node or the second node.

\* \* \* \* \*